US012487953B2

(12) United States Patent
Fruchard et al.

(10) Patent No.: US 12,487,953 B2
(45) Date of Patent: Dec. 2, 2025

(54) METHOD AND SYSTEM FOR POLLING COMMUNICATION DEVICES IN AN INDUSTRIAL NETWORK SYSTEM

(71) Applicant: Schneider Electric Industries SAS, Rueil Malmaison (FR)

(72) Inventors: Bertrand Fruchard, L'Isle d'Espagnac (FR); Caijin Wang, Singapore (SG)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 0 days.

(21) Appl. No.: 18/378,846

(22) Filed: Oct. 11, 2023

(65) Prior Publication Data
US 2024/0134808 A1 Apr. 25, 2024
US 2024/0232107 A9 Jul. 11, 2024

(30) Foreign Application Priority Data
Oct. 24, 2022 (EP) .................................... 22306609

(51) Int. Cl.
*G06F 13/26* (2006.01)
*G06F 13/22* (2006.01)

(52) U.S. Cl.
CPC ............ *G06F 13/26* (2013.01); *G06F 13/225* (2013.01)

(58) Field of Classification Search
CPC ........ G06F 13/26; G06F 13/225; G06F 13/30; G06F 13/36; G06F 13/362; G06F 13/366;
(Continued)

(56) References Cited

U.S. PATENT DOCUMENTS 5,345,562 A * 9/1994 Chen ..................... G06F 13/368
710/110
5,608,879 A * 3/1997 Cooke ..................... G06F 13/37
710/110

(Continued)

FOREIGN PATENT DOCUMENTS

WO WO-2021025864 A1 * 2/2021 .......... G06F 11/1044

OTHER PUBLICATIONS

European Search Report and Search Opinion dated Apr. 4, 2023 for corresponding European Patent Application No. EP22306609.3, 8 pages.

*Primary Examiner* — Raymond N Phan
(74) *Attorney, Agent, or Firm* — Patterson + Sheridan, LLP

(57) ABSTRACT

For polling communication devices in a communication system including a host device and communication devices. The host device is connected to the communication devices via a clock line for transmitting a clock signal to the communication devices and via an arbitration line implemented with "OR" logic for receiving arbitration signal transmitted by the communication devices. Each communication device is configured to pull up or down the arbitration line for sending an arbitration signal when the communication device is ready to send data to the host device. Each communication device is configured to pull down the arbitration line for sending an arbitration signal when the communication device has no data to send to the host device. The host device (HD) is able to: send a clock signal on the clock line during an arbitration cycle, causing the communication devices to send respective arbitration signals towards the arbitration line, during the arbitration cycle, receive a final signal corresponding to an addition of the arbitration signals, during the arbitration cycle, resulting from the "OR" logic applied to the arbitration signals, detect (Continued)

the communication devices ready to send data based on the "1" bit of the final signal, select, among the detected communication devices, the communication device associated with the highest priority in a priority table containing the priorities associated with the communication devices, and poll the selected communication device to receive data from the selected communication device during a communication cycle.

14 Claims, 3 Drawing Sheets

(58) Field of Classification Search
CPC ..... G06F 13/368; G06F 13/37; H04L 12/403; H04L 12/423; H04L 12/427
See application file for complete search history.

(56) References Cited

U.S. PATENT DOCUMENTS

| | | | |
|---|---|---|---|
| 7,979,615 B1* | 7/2011 | Spitzer | G06F 13/368 710/36 |
| 2002/0023186 A1* | 2/2002 | Kim | G06F 13/362 710/244 |
| 2002/0186662 A1 | 12/2002 | Tomassetti et al. | |
| 2014/0006665 A1* | 1/2014 | Amano | G06F 13/362 710/116 |
| 2015/0095537 A1 | 4/2015 | Sengoku | |
| 2015/0139653 A1* | 5/2015 | Binkert | H04J 14/0256 398/79 |
| 2019/0286587 A1 | 9/2019 | Mishra et al. | |

* cited by examiner

METHOD AND SYSTEM FOR POLLING COMMUNICATION DEVICES IN AN INDUSTRIAL NETWORK SYSTEM

FIELD OF INVENTION

The present invention relates to network systems comprising communication devices controlled by a host device. In particular, it concerns a polling scheme of the communication devices for a communication with the host device.

BACKGROUND

In wired communication networks, there is a need to assign addresses to communication devices (or nodes) that are present/added in the network. This can be performed manually or automatically.

Such communication network may form a wireless gateway device managing different wireless modules as communication devices implementing mixed critical applications using various wireless radio protocols integrated in modular way within the same gateway device. These wireless modules can use with Zigbee, Bluetooth and IO Link Wireless based Industrial IoT (Internet of Things), Industrial control applications but can be used for other applications too.

In the traditional communication process, the host device first assigns a unique bus address to communication devices during initialization, for example addresses 1, 2, 3 and 4 assigned respectively to communication devices 1, 2, 3 and 4. Then the host device can broadcast a polling request frame with dedicated address information to get the data from wanted communication device. The host device first sends the polling request frame with address 1 to communication device 1. Although all the communication devices can receive this polling request frame as broadcast, only communication device 1 will reply after checking the address information in the polling request frame. The host device repeats the same process to get the data from each communication device 2, 3 and 4 one by one.

There are some disadvantages in the traditional polling scheme. First, the host device doesn't know the data status of the communication device, so it may waste time in polling some communication devices that don't have any data in this cycle. Secondly, this polling scheme treats all the communication devices equally. But in some applications, some communication devices' data are more critical than others and they need to be polled first.

There is therefore a need for an efficient polling scheme of communication devices in communication system for an industry 4.0 application.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided a method for polling communication devices in a communication system comprising a host device and communication devices, wherein the host device is connected to the communication devices via a clock line for transmitting a clock signal to the communication devices and via an arbitration line implemented with "OR" logic for receiving arbitration signal transmitted by the communication devices, wherein each communication device is configured to pull up or down the arbitration line for sending an arbitration signal when said communication device is ready to send data to the host device, wherein each communication device is configured to pull down the arbitration line for sending an arbitration signal when said communication device has no data to send to the host device, the method comprises the following steps:

the host module sending a clock signal on the clock line during an arbitration cycle, the communication devices sending respective arbitration signals towards the arbitration line, during the arbitration cycle, the host module receiving a final signal corresponding to an addition of the arbitration signals, during the arbitration cycle, resulting from the "OR" logic applied to the arbitration signals, the host module detecting the communication devices ready to send data based on the "1" bit of the final signal, the host module selecting, among the detected communication devices, the communication device associated with the highest priority in a priority table containing priorities associated with the communication devices, the host module polling the selected communication device to receive data from the selected communication device during a communication cycle.

Advantageously, the method allows to reduce communication latency for high priority communication and to increase the communication efficiency of low cost field bus.

The host device only pools communication devices that have data to send. Thus the host device can avoid wasting time in pooling the communication devices without data to send. The host device pools the communication devices according to their priority. The communication devices with the highest priority can be served earlier so priority data are delivered to the system in priority.

In an embodiment, the host module polls the detected communication devices in an order depending on priorities associated with said detected communication devices in the priority table.

In an embodiment, each communication device is configured to pull up the arbitration line during at least one clock period of the clock signal.

In an embodiment, the communication devices are configured to pull up the arbitration line respectively during different clock periods of the clock signal.

In an embodiment, the arbitration line is implemented with "OR" logic, each communication device is associated with an address and the communication devices send respective arbitration signals towards the arbitration line according to their respective associated addresses.

In an embodiment, the addresses respectively associated with the communication devices have no "1" bit in common.

In an embodiment, the addresses respectively associated with the communication devices are incremented by at least two bits.

In an embodiment, a communication device sends an arbitration signal according to its associated address, from the most significant bit to the least significant bit or from the least significant bit to the most significant bit.

In an embodiment, the addresses respectively associated with the communication devices correspond respectively to the numbers of arbitration clock periods of the clock signal.

In an embodiment, the host device detects a communication device from the final signal, if the position of the "1" bit of the final signal corresponds to the position of the "1" bit of the address associated with said communication device.

In an embodiment, the priority between the communication devices is based on the type of the communication devices.

In another implementation, there is provided a host device for polling communication devices in a communication system comprising the host device and communication devices, wherein the host device is connected to the communication devices via a clock line for transmitting a clock signal to the communication devices and via an arbitration line implemented with "OR" logic for receiving arbitration signal transmitted by the communication devices, wherein each communication device is configured to pull up or down the arbitration line for sending an arbitration signal when said communication device is ready to send data to the host device, wherein each communication device is configured to pull down the arbitration line for sending an arbitration signal when said communication device has no data to send to the host device, the host device comprising:

one or more network interfaces to communicate with the communication devices, a processor coupled to the network interfaces and configured to execute one or more processes; and a memory configured to store a process executable by the processor, the process when executed operable to:

send a clock signal on the clock line during an arbitration cycle, causing the communication devices to sending respective arbitration signals towards the arbitration line (AL), during the arbitration cycle, receive a final signal corresponding to an addition of the arbitration signals, during the arbitration cycle, resulting from the "OR" logic applied to the arbitration signals, detect the communication devices ready to send data based on the "1" bit of the final signal, select, among the detected communication devices, the communication device associated with the highest priority in a priority table containing the priorities associated with the communication devices, poll the selected communication device to receive data from the selected communication device during a communication cycle.

In another implementation there is provided a computer-readable medium having embodied thereon a computer program for executing a method for polling communication devices in an industrial network system comprising a host device and the communication devices. Said computer program comprises instructions which carry out steps according to the method according to the invention.

In another implementation there is provided a system comprising the host device and a plurality of communication devices connected to the host device.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
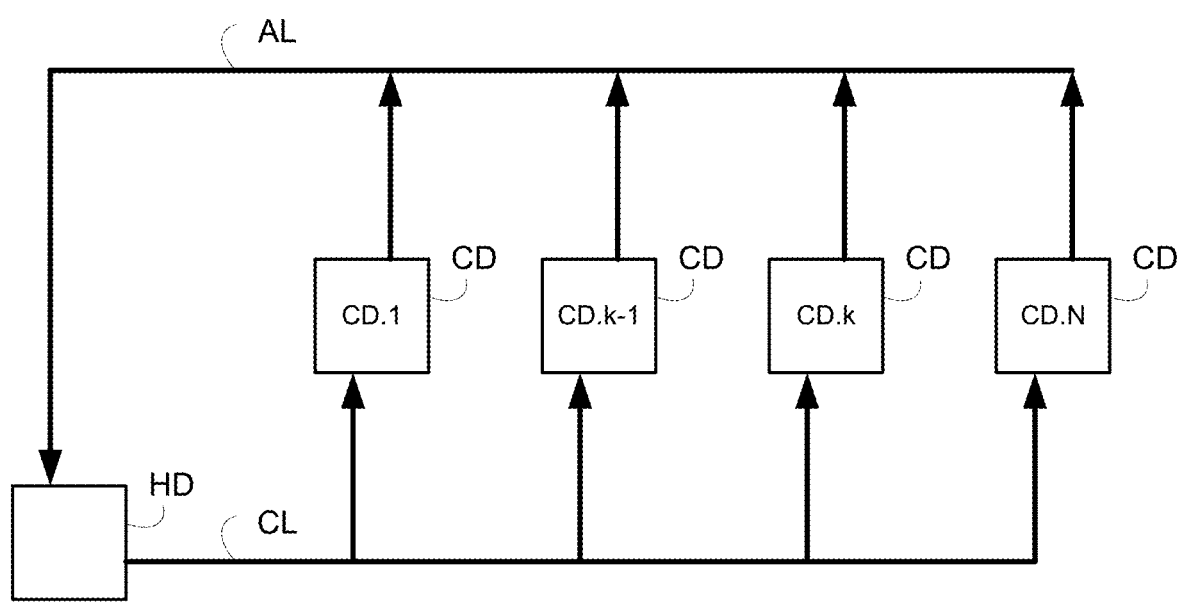
FIG. 1 shows a schematic block diagram of a communication system according to one embodiment of the invention for polling communication devices with priority in an industrial network system.

Referring to FIG. 1, a communication system comprises a host device HD and communication devices CD. The communication devices CD form a plurality of N communication devices CD (CD.1, CD.k-1, CD.k, . . . CD.N), N being an integer greater than or equal to 2, and k being an index varying between 1 and N. Each communication device is indexed by an index greater than or equal to 1, the communication device of index 1 being connected to the master device.

The host device HD is connected to the communication devices CD in parallel via a clock line CL and via an arbitration line AL that form together a half-duplex field bus.

The clock line CL is a signaling unidirectional fieldbus line carrying a clock signal from the host device HD to the communication devices CD. If a communication device CD detects a clock signal from the commission line CL, the communication device CD enters in an arbitration state, during an arbitration cycle that lasts the time of the clock signal.

For example, the clock signal can be also a code signal or any signal including a specific pattern. If the clock signal is a specific frequency clock signal, a communication device will enter in an arbitration state only if it receives a signal from the clock line CL including such specific frequency clock.

The arbitration line CL is a signaling unidirectional fieldbus line carrying a data signal from the communication devices CD to the host device HD. The arbitration line CL is configured with an "OR" logic: if any communication device CD sends a logic "1", the logic value received by the host device is "1".

In one embodiment, a communication device CD can send a signal on the arbitration line CL by pulling up the voltage of the arbitration line for a "1" signal bit or by pulling down the voltage of the arbitration line for a "0"

signal bit. If a communication device CD has no data to send, it can only pull down the voltage of the arbitration line for a "0" signal bit.

A communication device CD is a communication module using an application, dedicated sensors and a communication protocol. In one embodiment, the communication devices CD are radio modules using Zigbee, Bluetooth, WiFi and IO Link Wireless based Industrial IoT (Internet of Things). The host device HD and the communication devices CD form a wireless gateway device managing mixed critical application using various wireless protocol radio integrated in modular way within the same gateway device. In one embodiment for industrial application, the communication devices CD are arranged in a stacked-up manner upon the master device, forming a wireless gateway system under the form of a column.

In one embodiment, each communication device is indexed by an index k greater than or equal to 1 and is associated with an identifier Id_k.

In one embodiment, each communication device is indexed by an index k greater than or equal to 1 and is associated with at least one clock period of the clock signal.

In one embodiment, all the communication devices may have initially a common default address, such as 0XFE for example, and after an enrollment process may have a defined address on the arbitration line AL. In one embodiment, each communication device is indexed by an index k greater than or equal to 1 and is associated with an address Add_k.

In one embodiment, the address Add_k of communication device CD.k of index k is defined according to a type of the communication devices. In one embodiment, the priority between the communication devices is based on the type of the communication devices.

In one embodiment, the identifier Id_k of communication device CD.k corresponds to the address Add_k of communication device CD.k. In one embodiment, the identifier Id_k of communication device CD.k corresponds to the number of the clock period of the clock signal associated with the communication device CD.k.

The host device HD may store device information of the communication device of index k in the information table. The device information contains for example a name of the communication device of index k, the identifier of the communication device of index k, the address of the communication device of index k and a type of the communication device of index k. The identifier of the communication device can be a unique serial number that is saved into a memory of the communication device during production. The type of communication device can be a supporting function code that is saved into a memory of the communication device during production. The communication device with the same function or functions are designed to use the same type of communication device.

In one embodiment, the host device HD further stores a priority table listing the identifiers Id_k of the communication devices CD.k in correspondence with priorities he host device HD further stores in the priority table the addresses Add_k of the communication devices CD.k in correspondence with priorities. In one embodiment, the host device HD further stores in the priority table clock periods of the clock signal associated with the communication devices CD.k in correspondence with priorities. In one embodiment, the priority is under the form of a number, wherein the smallest number correspond to the highest priority.

In an example system, there is provided a communication device CD.1 with an identifier Id_1 value equal to "01" when the identifier Id_1 corresponds to an address or "2" when the identifier Id_1 corresponds to a number of the clock period of the clock signal and a communication device CD.2 with an identifier Id_2 value equal to "10" when the identifier Id_2 corresponds to an address or "1" when the identifier Id_2 corresponds to a number of the clock period of the clock signal. When the host device wants to communicate with the communication devices CD.1, CD.2, the host device will start an arbitration first. To that end, the host device sends out a clock signal in the arbitration line. Both communication devices have data to send: they join the arbitration and controls the arbitration line's voltage according to their address values or their associated clock periods of the clock signal. The communication device CD.1 pulls down then pulls up the arbitration line because its identifier is "01" or "2", and at the same time, the communication device CD.2 pulls up then pulls down the arbitration line because its identifier is "10" or "1". Because of the "OR" function in the arbitration line, the final voltage value in the arbitration line is "11" and the host device detects the identifier Id_1 of communication device CD.1 and the identifier Id_2 of communication device CD.2 based on the "1" bits of the final voltage value. The host device will then communicate first with communication device CD.2 and then with communication device CD.1 in a communication cycle following the arbitration cycle, because communication device CD.2 has higher priority than communication device CD. in the priority table. During the communication cycle, the host device sends for example a request to the communication device CD.2 (then CD.1) that then sends a reply to the host device.

In a general manner, if a communication device has data and detect a falling edge in the clock line, it will set the arbitration line's voltage to high or low according to its address value or to its associated clock period of the clock signal. In one embodiment, communication device sets the arbitration line's voltage from highest bit to lowest bit, i.e. from the most significant bit to the least significant bit. In another embodiment, communication device sets the arbitration line's voltage from lowest bit to highest bit, i.e. from the least significant bit to the most significant bit. If a communication device has no data and detect a falling edge in the arbitration line, it will set the arbitration line's voltage to low till the end of the clock signal.

During the arbitration cycle, the communication devices send their respective arbitration signals towards the arbitration line according to their respective associated addresses Add_k or to their respective associated clock periods of the clock signal if they have data to send, and the communication devices send their respective arbitration signals towards the arbitration line according to a zero value if they do not have data to send.

In one embodiment, the addresses respectively associated with the different communication devices are different and have no "1" bit in common. In one embodiment, the addresses respectively associated with the communication devices are incremented by at least two bits. In one embodiment, the addresses respectively associated with the communication devices contain only one "1" bit.

In one embodiment, the communication devices are configured to pull up the arbitration line respectively during different clock periods of the clock signal and have no clock period of the clock signal in common. In one embodiment, a communication device pulls up the arbitration line during only one clock period of the clock signal and pulls down the arbitration line during other clock periods of the clock signal in order that the host module receives a final signal comprising a "1" bit corresponding to said only one clock period of the clock signal.

In one embodiment, the addresses respectively associated with the communication devices correspond respectively to the numbers of arbitration clock periods of the clock signal.

Figure 2:
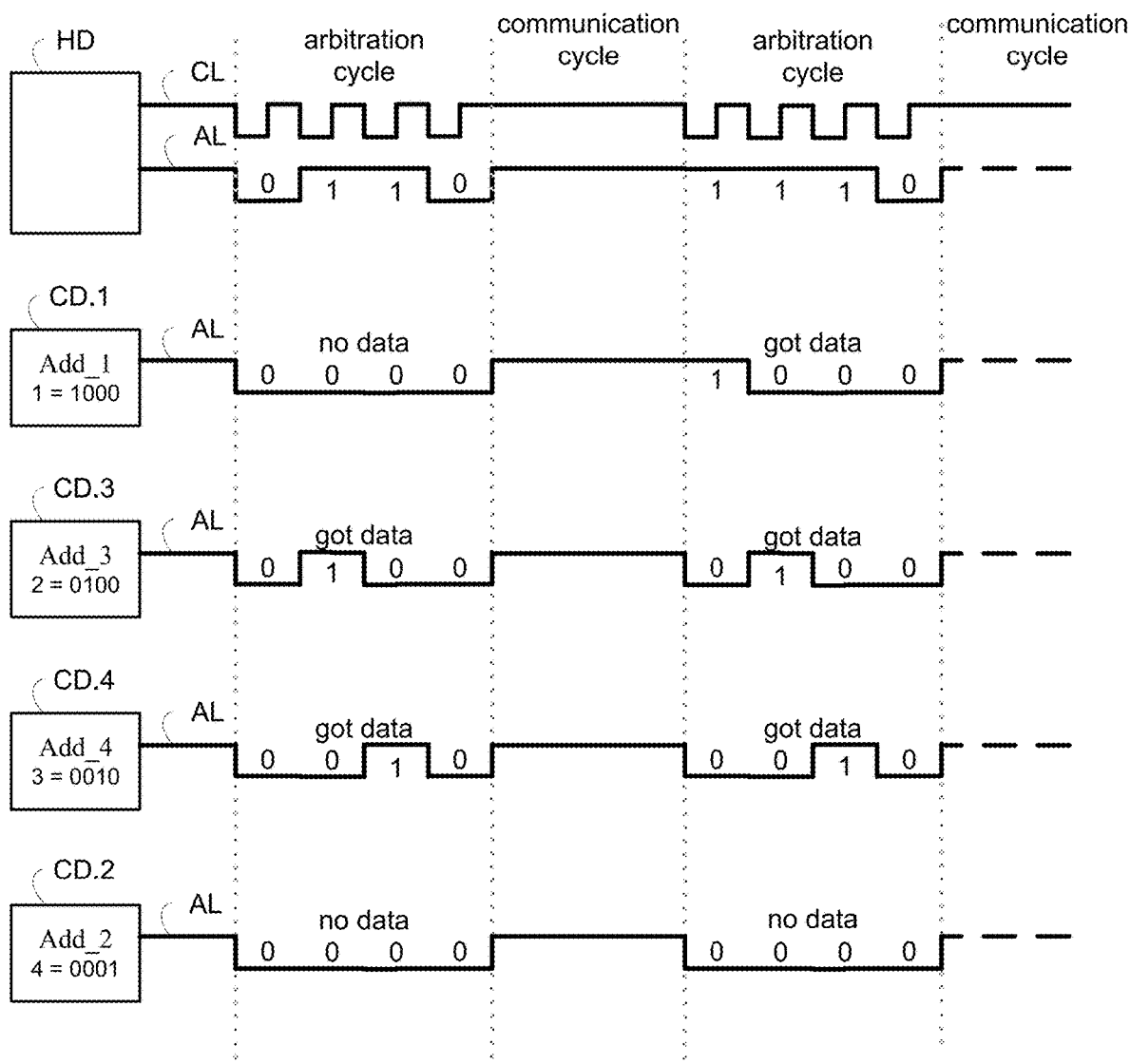
FIG. 2 shows a schematic block diagram illustrating a polling communication process with priority table among communication devices.

Referring to FIG. 2, a polling communication process with priority is described with addresses used as identifiers for the communication devices. A communication system comprises a host device HD, a communication device CD.1 with an address Add_1 value equal to "1000", a communication device CD.2 with an address Add_2 value equal to "0001", a communication device CD.3 with an address Add_3 value equal to "0100" and a communication device CD.4 with an address Add 4 value equal to "0010". The communication devices are placed according to priority based on their addresses.

During a first arbitration cycle, all communication devices join the arbitration process but only communication devices CD.3 and CD.4 have data to send. At the first clock period, communication devices CD.3 and CD.4 set the arbitration line low according to their highest address bit, i.e. "0", whereas communication devices CD.1 and CD.2. set the arbitration line low also because they have no data to send. At the second clock period, the communication device CD.3 sets the arbitration line high according to its second address Add_3 value "1", the communication device CD.4 sets the arbitration line low according to its second address Add_4 value "0", whereas communication devices CD.1 and CD.2. set again the arbitration line low also because they have no data to send. At the third clock period, the communication device CD.3 sets the arbitration line low according to its third address Add_3 value "0", the communication device CD.4 sets the arbitration line high according to its third address Add_4 value "1", whereas communication devices CD.1 and CD.2 set again the arbitration line low also because they have no data to send. At the fourth clock period, the communication devices CD.3 and CD.4 set the arbitration line low according to their lowest address bit, i.e. "0", whereas communication devices CD.1 and CD.2 set again the arbitration line low also because they have no data to send.

At the end of the arbitration cycle, the host module has received a final signal corresponding to an addition of the arbitration signals sent by the communication devices, resulting from the "OR" logic applied to the arbitration signals. The final signal contains the bits "0110". The host module is then able to detect the communication devices ready to send data based on the "1" bit of the final signal corresponding to addresses associated with said communication devices. In this case, the host module detects that communication devices CD.3 and CD.4 are ready to send data.

The host device selects the communication devices CD.3 and CD.4 to communicate with them, by exchanging request and reply in a communication cycle following the arbitration cycle. The host device communicates with the communication devices CD.3 and CD.4 in an order defined by the priorities associated respectively with communication devices CD.3 and CD.4 in the priority table.

During a second arbitration cycle, all communication devices join the arbitration process, with communication devices CD.1, CD.3 and CD.4 having data to send. At the first clock period, communication device CD.1 sets the arbitration line high according to its highest address bit value "1", communication devices CD.3 and CD.4 set the arbitration line low according to their highest address bit, i.e. "0", whereas communication device sets the arbitration line low also because it has no data to send. At the second clock period, the communication device CD.3 sets the arbitration line high according to its second address Add_3 value "1", the communication devices CD.1 and CD.4 set the arbitration line low according to their second address value "0", whereas communication device CD.2. sets again the arbitration line low also because it has no data to send. At the third clock period, the communication devices CD.1 and CD.3 set the arbitration line low according to their third address value "0", the communication device CD.4 sets the arbitration line high according to its third address Add_4 value "1", whereas communication device CD.2 sets again the arbitration line low also because it has no data to send. At the fourth clock period, the communication devices CD.1, CD.3 and CD.4 set the arbitration line low according to their lowest address bit, i.e. "0", whereas communication device CD.2 sets again the arbitration line low also because it has have no data to send.

At the end of the arbitration cycle, the host module has received a final signal corresponding to an addition of the arbitration signals sent by the communication devices, resulting from the "OR" logic applied to the arbitration signals. The final signal contains the bits "1110". The host module is then able to detect the communication devices ready to send data based on the "1" bit of the final signal corresponding to addresses associated with said communication devices. In this case, the host module detects that communication devices CD.1, CD.3 and CD.4 are ready to send data.

The host device selects the communication devices CD.1, CD.3 and CD.4 to communicate with them, by exchanging request and reply in a communication cycle following the arbitration cycle. The host device communicates with the communication devices CD.1, CD.3 and CD.4 in an order defined by the priorities associated respectively with communication devices CD.1, CD.3 and CD.4 in the priority table. If the communication device CD.1 has the highest priority, the host device communicates first with the communication device CD.1.

An embodiment comprises a host device HD under the form of an apparatus comprising one or more processor(s), I/O interface(s), network interfaces, and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media.

Figure 3:
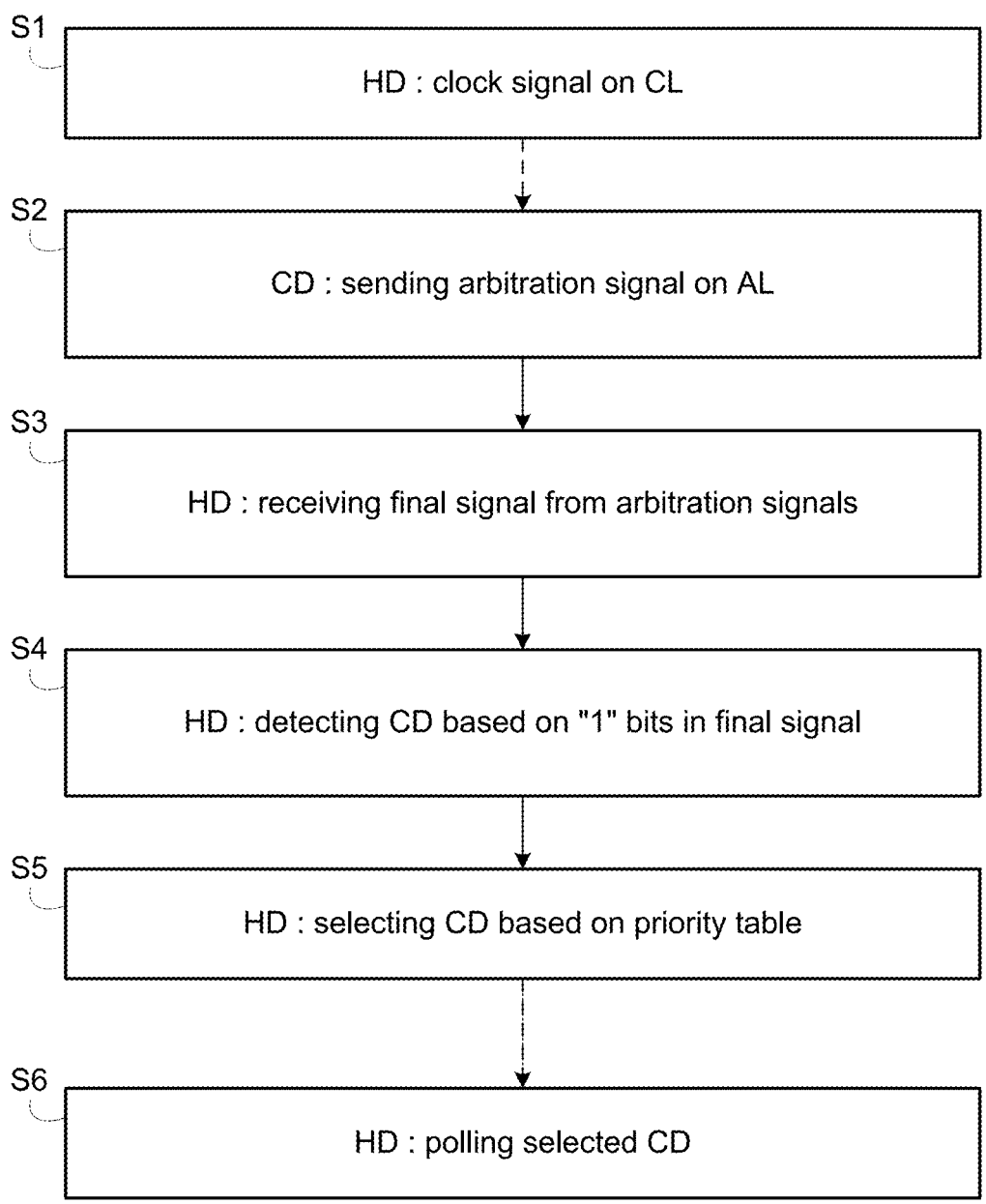
FIG. 3 shows a flow chart illustrating a method for polling communication devices with priority in an industrial network system according to one embodiment of the invention.

With reference to FIG. 3, a method for polling communication devices with priority in a communication system according to one embodiment of the invention comprises steps S1 to S6.

In step S1, the host module HD sends a clock signal on the clock line CL during an arbitration cycle.

In step S2, the communication devices CD send their respective arbitration signals towards the arbitration line AL according to respective associated identifiers. If a communication device CD has no data to send, it sends an arbitration signal containing only "0" bits.

In step S3, the host module HD receives a final signal corresponding to an addition of the arbitration signals sent from the communication devices CD, resulting from the "OR" logic applied to the arbitration signals.

In step S4, the host module HD detects the communication devices ready to send data based on the "1" bit of the final signal, that can correspond to addresses or clock periods of the clock signal associated with said communication devices.

In one embodiment, the host device detects a communication device from the final signal, if the position of the "1" bit of the final signal corresponds to the position of the "1" bit of the address associated with said communication device or correspond to the number of the clock period of the clock signal associated with said communication device.

In step S5, the host module HD selects, among the detected communication devices, the communication device associated with the highest priority in a priority table containing the identifiers associated with the communication devices.

In step S6, the host module HD polls the selected communication device to receive data from the selected communication device during a communication cycle.

Then, the host module HD polls the detected communication devices in an order depending on priorities associated with said detected communication devices in the priority table.

In case a communication device cannot communicate with the host device due to its lower priority in comparison to other communication devices with higher priority, it is defined a timer called a starve cycle.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:
1. A method for polling communication devices in a communication system comprising a host device and the communication devices, wherein the host device is connected to the communication devices via a clock line for transmitting a clock signal to the communication devices and via an arbitration line implemented with "OR" logic for receiving arbitration signals transmitted by the communication devices, wherein each of the communication devices is configured to pull up or down the arbitration line for sending an arbitration signal when one of the communication devices is ready to send data to the host device, wherein each of the communication devices is configured to pull down the arbitration line for sending an arbitration signal when one of the communication devices has no data to send to the host device, the method comprises:
   the host device sending a clock signal on the clock line during an arbitration cycle,
   the communication devices sending respective arbitration signals towards the arbitration line in response to the clock signal on the clock line, during the arbitration cycle, the arbitration signals sent by the communication devices being added to each other on the arbitration line by the "OR" logic thereof to produce a final signal, the final signal having a sequence of bits, different bits in the sequence of bits corresponding to different communication devices, a "1" bit in the sequence of bits indicating that a corresponding communication device is ready to send data and a "0" bit indicating that the corresponding communication device is not ready to send data,
   the host device receiving the final signal corresponding to the addition of the arbitration signals, during the arbitration cycle, resulting from the "OR" logic applied to the arbitration signals,
   the host device detecting that the communication devices are ready to send data based on the "1" bits of the final signal,
   the host device selecting, among the communication devices that were detected as ready to send data, the communication device associated with the highest priority in a priority table containing priorities associated with the communication devices, and
   the host device polling the selected communication device to receive data from the selected communication device during a communication cycle.

2. The method according to claim 1, wherein the host device polls the detected communication devices in an order depending on priorities associated with said detected communication devices in the priority table.

3. The method according to claim 1, wherein each of the communication devices is configured to pull up the arbitration line during at least one clock period of the clock signal.

4. The method according to claim 1, wherein each of the communication devices is associated with an address and the communication devices send respective arbitration signals towards the arbitration line according to their respective associated addresses.

5. The method according to claim 3, wherein the communication devices are configured to pull up the arbitration line respectively during different clock periods of the clock signal.

6. A non-transitory computer readable storage medium, with a computer program stored thereon, said computer program comprising instructions for, when executed by a processor, carrying out the method according to claim 1.

7. The method according to claim 4, wherein the addresses respectively associated with the communication devices have no "1" bit in common.

8. The method according to claim 4, wherein the addresses respectively associated with the communication devices are incremented by at least two bits.

9. The method according to claim 4, wherein a communication device of the communication devices sends an arbitration signal according to its associated address, from the most significant bit to the least significant bit or from the least significant bit to the most significant bit.

10. The method according to claim 4, wherein the addresses respectively associated with the communication devices correspond respectively to the numbers of arbitration clock periods of the clock signal.

11. The method according to claim 4, wherein the host device detects a communication device of the communication devices from the final signal, if the position of the "1" bit of the final signal corresponds to the position of the "1" bit of the address associated with said communication device.

12. The method according to claim 1, wherein the priority between the communication devices is based on the type of the communication devices.

13. A host device for polling communication devices in a communication system comprising the host device and the communication devices, wherein the host device is connected to the communication devices via a clock line for transmitting a clock signal to the communication devices and via an arbitration line implemented with "OR" logic for receiving arbitration signals transmitted by the communication devices, wherein each of the communication devices is configured to pull up or down the arbitration line for sending an arbitration signal when one of the communication devices is ready to send data to the host device, wherein each of the communication devices is configured to pull down the arbitration line for sending an arbitration signal when one of the communication devices has no data to send to the host device, the host device comprising:

one or more network interfaces to communicate with the communication devices, a processor coupled to the network interfaces and configured to execute one or more processes; and a memory configured to store a process executable by the processor, the process when executed operable to:

send a clock signal on the clock line during an arbitration cycle, the communication devices sending respective arbitration signals towards the arbitration line in response to the clock signal on the clock line, during the arbitration cycle, the arbitration signals sent by the communication devices being added to each other on the arbitration line by the "OR" logic thereof to produce a final signal, the final signal having a sequence of bits, different bits in the sequence of bits corresponding to different ones of the communication devices, a "1" bit in the sequence of bits indicating that a corresponding communication device is ready to send data and a "0" bit indicating that the corresponding communication device is not ready to send data, receive the final signal corresponding to the addition of the arbitration signals, during the arbitration cycle, resulting from the "OR" logic applied to the arbitration signals, detect that the communication devices are ready to send data based on the "1" bits of the final signal, select, among the communication devices that were detected as ready to send data, the communication device associated with the highest priority in a priority table containing the priorities associated with the communication devices, and poll the selected communication device to receive data from the selected communication device during a communication cycle.

14. A system comprising a host device according to claim 13 and a plurality of communication devices connected to the host device.

* * * * *